United States Patent [19]
Wang et al.

[11] Patent Number: 5,867,672
[45] Date of Patent: Feb. 2, 1999

[54] TRIPLE-BUS FIFO BUFFERS THAT CAN BE CHAINED TOGETHER TO INCREASE BUFFER DEPTH

[75] Inventors: Eugene D. Wang, Santa Clara; Mario F. Au, Fremont, both of Calif.

[73] Assignee: Integrated Device Technology, Inc., Santa Clara, Calif.

[21] Appl. No.: 646,826

[22] Filed: May 21, 1996

[51] Int. Cl.$^6$ .................................................. G06F 13/38
[52] U.S. Cl. .......................... 395/307; 395/309; 395/872
[58] Field of Search .................................. 395/250, 306, 395/307, 309, 311, 497.01, 872, 877, 310; 711/170

[56] References Cited

U.S. PATENT DOCUMENTS

| | | | |
|---|---|---|---|
| 4,509,113 | 4/1985 | Heath | 395/886 |
| 4,616,338 | 10/1986 | Helen et al. | 395/873 |
| 4,833,655 | 5/1989 | Wolf et al. | 365/221 |
| 5,107,415 | 4/1992 | Sato et al. | 395/898 |
| 5,113,369 | 5/1992 | Kinoshita | 395/307 |
| 5,220,651 | 6/1993 | Larson | 395/828 |
| 5,255,239 | 10/1993 | Taborn et al. | 365/221 |
| 5,280,598 | 1/1994 | Osaki et al. | 395/307 |
| 5,313,587 | 5/1994 | Patel | 395/840 |
| 5,325,487 | 6/1994 | Au et al. | 711/131 |
| 5,566,306 | 10/1996 | Islinda | 395/309 |
| 5,594,877 | 1/1997 | Lentz et al. | 395/306 |
| 5,600,815 | 2/1997 | Lin et al. | 711/109 |

OTHER PUBLICATIONS

Integrated Device Technology Data Book, Sec. 5.16, "CMOS SyncBiFIFO 256×36×2, 512×36×2, 1024×36×2", Integrated Device Technology, Jan. 1995, pp. 1–26.

*Primary Examiner*—Parshotam S. Lall
*Assistant Examiner*—Viet Vu
*Attorney, Agent, or Firm*—Skjerven, Morrill, MacPherson, Franklin & Friel

[57] ABSTRACT

A buffer IC includes two FIFO buffers accessible in a triple-bus configuration including a bi-directional port, an input port, and an output port. Each of the ports uses a fall-through timing which facilitates interconnection of similar buffer ICs into a chain to expand the depth of a FIFO buffer. Typically, the input and output ports have a data width that differs from the data width of the bi-directional bus the FIFO buffers perform bus matching. One type of bus matching collects data values from the smaller width port to form larger width values for output from the larger port. Another type of bus matching splits data values from the larger width port to form data values for output from the smaller port.

11 Claims, 12 Drawing Sheets

5,867,672

TRIPLE-BUS FIFO BUFFERS THAT CAN BE CHAINED TOGETHER TO INCREASE BUFFER DEPTH

BACKGROUND OF THE INVENTION

1. Field of the Invention

This invention relates to first-in-first-out buffers.

2. Description of Related Art

First-in first-out (FIFO) buffers are well known for intermediating data flow between devices. FIFO buffers have input and output ports which operate independently to allow devices connected to the FIFO buffer to write and read asynchronously. For example, a first device writes to the FIFO buffer via an input port, and a second device reads from the FIFO buffer via an output port to create a one-way data flow from the first device to the second device. FIFO buffers maintain read and write pointers which indicated where data is written or read so that the first values written into the FIFO buffer are the first values read out. Control logic handles handshake and/or flags signals to and from attached devices to control access and prevent the devices from trying to write to a full buffer or read from an empty buffer.

FIFO buffers have been implemented as integrated circuits (ICs) containing memory, input/output (I/O) ports, and control logic. FIFO buffer ICs flexible enough for a wide variety of applications are sought. One limit on FIFO buffer flexibility is memory size which may be insufficient for some applications. A large memory increases the number of applications of the FIFO buffer IC but also increases manufacturing costs. Another limit on a FIFO buffer's flexibility is its input/output (I/O) interface. For example, an IC containing the two FIFO buffers can provide a bi-directional data path, but some devices which would attach to a FIFO buffer require a bi-directional port while other devices require separate input and output ports. Additionally, data widths (i.e. the number of parallel bits contained in a data signal) vary from device to device. A FIFO buffer which has only bi-directional ports or only separate input and output ports or ports with fixed data widths is limited in its applications.

SUMMARY OF THE INVENTION

In accordance with the invention, a buffer IC includes two first-in first-out (FIFO) buffers accessible in a triple-bus configuration which includes a bi-directional port, an input port, and an output port. Typically, the input and output ports have configurable data widths that can differ from the data width of the bi-directional bus. To accommodate differences in data widths, the FIFO buffers perform bus matching. Bus matching on an input side of a FIFO buffer collects data values from the smaller width port to form a larger width value which is stored in the FIFO buffer for output from the larger port. Bus matching on the output side of a FIFO buffer splits data values from the larger width port to form data values for output from the smaller port. Data ports which perform bus matching can be further configurable so that collecting data and splitting data is performed according to a user selected order such as big endian order or little endian order.

Each of the ports use a fall-through timing protocol which facilitates interconnection of the buffer IC into a chain. The fall through timing uses an output-ready signal and an input-ready signal in place of flag signals such as an empty flag and a full flag. For output of data, a port asserts an output-ready signal in the clock cycle during which an output data signal becomes ready. An external device, if ready for input data, reads the data signal during the next cycle. The port receives from the external device an enable signal which indicates whether the external is ready to read the data signal from the output port. The port then either generates a next data signal for the external device or deasserts the output ready signal before the next data signal is read.

For input of data, a port asserts an input-ready signal if the port will be ready to latch a data signal in the following clock cycle. The port only latches the data signal if the port is enabled by an enable signal from the external device. If output data from the external device will be ready during the next clock cycle, the external device enables the port.

The input-ready and enable signals for input of data are complementary to the enable and output-ready signals for output of data. With fall-through timing, control terminals and a data bus of an input port can be directly coupled to control terminals and a data bus for an output port, and the input-ready and output-ready signals will enable the opposite port as required to complete a data transfer. Accordingly, an aspect of the fall through timing is that no additional circuitry is required to connect two or more FIFO buffer ICs into a chain. The chain of FIFO buffers acts as a FIFO buffer having a depth equal to the combined capacity of FIFO buffers linked in the chain, and FIFO buffer integrated circuits in accordance with the invention can be easily combined for applications requiring more memory.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a triple-bus first-in-first-out (FIFO) buffer includes three ports for data flows through two FIFO buffers. The three ports include an input port, an output port, and a bi-directional port. The bi-directional port handles input to a first FIFO buffer and output from a second FIFO buffer. The output port handles output from the first FIFO buffer, and the input port handles input to the second FIFO buffer. The triple-bus FIFO buffer can be connected to a device having a bi-directional bus and one or more devices having one-way busses.

In an exemplary embodiment of the invention, the input and output ports each support half the data width supported by the bi-directional port. Connecting input ports and output ports of two such FIFO buffers provides a bi-directional FIFO buffer having greater depth than one buffer alone. A fall-through timing protocol for the ports simplifies interconnection of buffers to expand FIFO depth.

The exemplary embodiment can perform bus matching to accommodate devices having different data widths. For example, if a first device uses bytes of data and a second device uses long words (four bytes) of data, the FIFO buffer collects four bytes from the first device to form a long word which is transferred to the second device and splits a long word from the second device into four bytes which are sequentially transferred to the second device. A user can set the order in which bytes are collected or transferred to big endian or little endian order.

Figure 1:
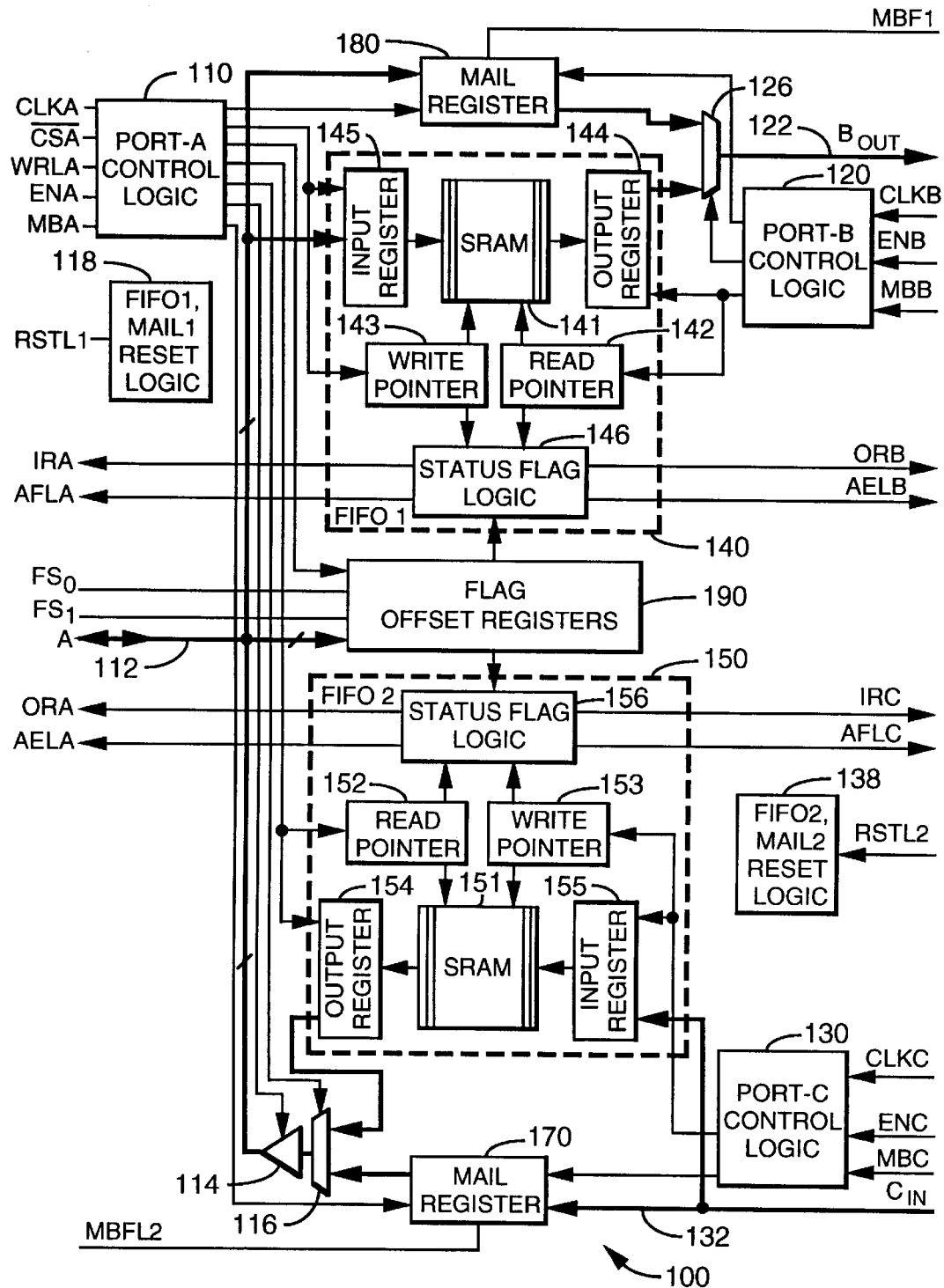
FIG. 1 shows a block diagram of a buffer in accordance with an embodiment of the invention.

FIG. 1 shows a functional block diagram of a buffer 100 in accordance with an embodiment of the invention. Buffer 100 includes three I/O ports A, $B_{OUT}$, and $C_{IN}$ for two FIFO buffers 140 and 150. Each of FIFO buffers 140 and 150 includes a memory 141 or 151, a read pointer register 142 or 152, a write pointer register 143 or 153, an output register 144 or 154, an input register 145 or 155, and status flag logic 146 or 156.

In FIFO buffer 140, status flag logic 146 generates an almost-full flag signal AFLA, an almost-empty flag signal AELB, an input-ready signal IRA, and an output ready signal ORB. Status flag logic 156 similarly generates an almost-full flag signal AFLC, an almost-empty flag signal AELA, an input-ready signal IRC, and an output ready signal ORA. Status flag logic 146 or 156 generates an almost empty flag AELB or AELA or an almost-full flag AFLA or AFLC when a count of the data in memory 141 or 151 equals a corresponding offset stored in flag offset registers 190. Such almost-full and almost-empty flags are conventional, and methods and circuits for generating such signals are well known. Input-ready signals IRA and IRC and output ready signals ORB and ORA have novel fall-through timing as described below.

In buffer 100, port A is bi-directional and includes control logic 110 and a bi-directional bus 112 for a multi-bit data signal A. Signals such as a clock signal CLKA from a device connected to port A control timing of data transfers through port A. Data signal A on bus 112 is for input to FIFO buffer 140, flag offset registers 190, or a mail register 180 or for output via multiplexer 116 and a tri-state buffer 114 from FIFO buffer 150 or a mail register 170. Control logic 110 controls tri-state buffer 114 according to a write/read select signal WRLA for port A and determines whether bus 112 carries an input or output signal. Signal CSA is a chip select signal which is asserted to permit writes or reads on port A.

Control logic 110 also controls writing data into FIFO buffer 140, flag offset registers 190, or mail register 180 and reading data from FIFO buffer 150 or mail register 170. Flag-select signals $FS_0$ and $FS_1$ select default values or program mode (serial or parallel) for flag offset registers 190. For writing to FIFO buffer 140, control logic 110 generates control signals required for storing the data signal from bus 112 into input register 145 and memory 141. Write pointer register 143 provides a write pointer indicating an address where data is written in memory 141. Control logic 110 generates control signals required for generation of an output data signal representing a data value from FIFO buffer 150 or mail register 170. Read pointer register 152 provides a read pointer indicating an address where data is read from memory 151.

Mail registers 170 and 180 intermediate data flows which bypass FIFO buffers 140 and 150. A devices connected to port A of buffer 100 access mail register 170 or 180 by asserting a mailbox select signal MBA and an appropriate write/read select signal WRLA. Devices connected to ports $B_{OUT}$ and $C_{IN}$ access mail register 180 and 170 respectively by asserting respective mailbox select signals MBB and MBC. Buffer 100 asserts a flag signal MBF1 or MBF2 when mailbox 170 or 180 contains data to be read.

Port $B_{OUT}$ is an output port which includes control logic 120 and an output bus 122 for a multi-bit output data signal B from FIFO buffer 140 or mail register 180. Control logic 120 and a multiplexer 126 select whether FIFO buffer 140 or mail register 180 drives bus 122. Read pointer 142 provides a read pointer indicating a location in memory 141 from which data is transferred to output register 144. Output register 144 provides the stored data value when FIFO buffer 140 drives bus 122. A clock signal CLKB from a device connected to port $B_{OUT}$ controls timing of data transfers through port $B_{OUT}$ so that port $B_{OUT}$ can operate asynchronously from port A.

Port $C_{IN}$ is an input port which includes control logic 130 and an input bus 132 for a multi-bit data signal C input to FIFO buffer 150 or mail register 170. Control logic 130 selects whether input register 155 or mail register 170 stores data signal C from bus 132 when triggered by a device connected to port $C_{IN}$. If FIFO buffer 150 is to store data signal C, control logic 130 generates signals required for FIFO buffer 150 to write the data from input register 155 to an address in memory 151, indicated by write pointer 153. A clock signal CLKC from a device connected to port $C_{IN}$ controls timing of data transfers through port $C_{IN}$ so that port $C_{IN}$ can operate asynchronously from ports A and $B_{OUT}$.

In an exemplary embodiment of the invention, busses 122 and 132 are each 18-bit busses, bus 112 is a 36-bit bus, and buffer 100 provides bus matching. The 18-bit busses can carry two bytes of data with a ninth or check bit for each byte. The 36-bit busses can carry four bytes of data with one check bit for each byte. Memories 141 and 151 in FIFO buffers 140 and 150 are 9 kbytes, 18 kbytes, or 36 kbytes in size and have 36-bit data widths. Many alternative embodiments are possible. Typically, bus widths would be multiples of 8-bit bytes with or without provisions for check bits, and the memory data width is equal to the largest data width for the ports.

Figure 2:
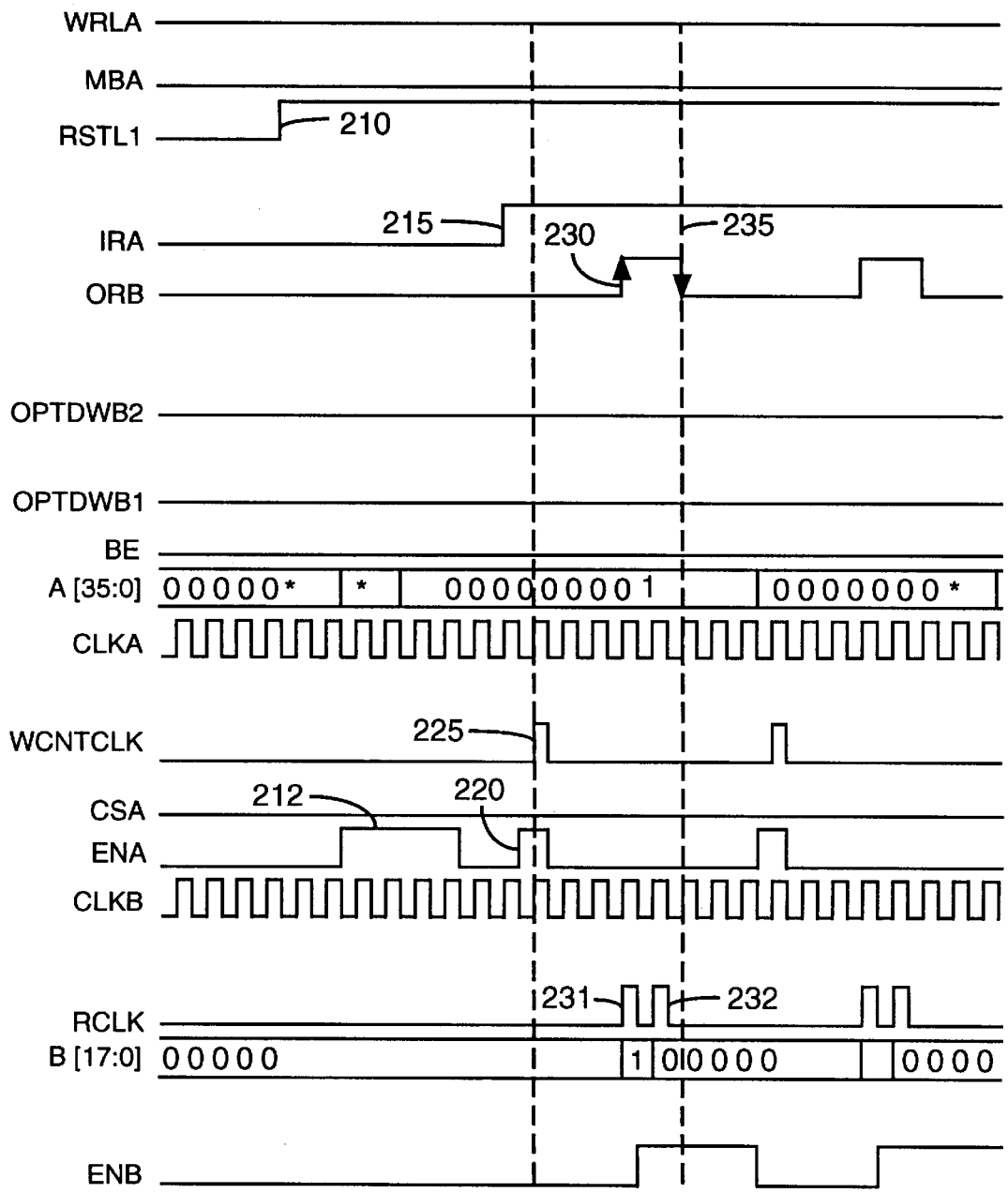
FIGS. 2 and 3 show timing diagrams for data transfers through the FIFO buffer of FIG. 1.

FIG. 2 shows timing diagrams for data transfers from a first device connected to port A to a second device connected to port $B_{OUT}$. The first and second devices can be any sort of devices which communicate via a FIFO buffer. For example, a microprocessor (first device) which communicates with a digital display or laser printer (second device) through buffer 100. For transfers from the first device to the second device via FIFO buffer 140, the first device asserts chip select signal CSA low and write/read select signal WRLA high to configure port A for writing and deasserts mail box select signal MBA to select FIFO buffer 140.

The first device initializes FIFO buffer 140 by asserting a reset signal RSTL1 low before transfer begins. When signal RSTL1 is low, reset logic 118 sets read pointer 142 equal to write pointer 143. When signal RSTL1 transitions at time 210, FIFO buffer 140 prepares for data transfer, for example, by programming flag offset registers 190. An enable signal ENA is asserted during an interval 212 to enable port A and allow the first device to program flag offset registers 190. At time 215, when preparation is complete, FIFO buffer 140 asserts an input-ready signal IRA high to indicate FIFO buffer 140 is ready to receive an input data signal A on bus 112. An output-ready signal ORB is low indicating that FIFO buffer 140 is not ready to provide data because buffer 140 is empty.

When signal IRA is asserted, the first device can generate data signal A on bus 112. The first device asserts enable signal ENA at time 220 to indicate that data signal A on bus 112 represents a value to be written to FIFO buffer 140. The first device also generates a clock signal CLKA which controls timing for port A and writes to FIFO buffer 140. At each rising edge 225 of signal CLKA while signals ENA and IRA are asserted, input register 145 captures data from bus 112, and the data is written to memory 141 at an address indicated by write pointer 143. Following each write, write pointer register 143 is incremented. For proper operation, the first device either must change signal A to the next value to be stored or deassert signal ENA before the next rising edge of clock signal CLKA. FIFO buffer 140 deasserts input-ready signal IRA if the FIFO buffer 140 is no longer ready for input, for example, if memory 141 is full. In the example of FIG. 2, signal ENA is asserted for one cycle of signal CLKA starting at time 220 so that a single 36-bit value is transferred to memory 141 at time 225.

Data from an address indicated by read pointer register 142 is automatically transferred to output register 144 when output register 144 is empty but memory 141 is not. In accordance with the exemplary embodiment, output register 144 is a 36-bit register and is loaded with a 36-bit value from memory 141. Multiplexer 126 selects a desired 18-bit output signal B[17:0] from the 36-bits in output register 144, and the second device (the device attached to port $B_{OUT}$) requires two reads to empty output register 144. Accordingly, reading data and incrementing read pointer register 142 occurs every other time a new value of signal B[17:0] is produced. Read pointer register 142 increments before the next 36-bit value is transferred to output register 144.

When multiplexer 126 selects and drives signal B[17:0] on bus 122, FIFO buffer 140 asserts output-ready signal ORB high to indicate to the second device that signal B[17:0] is ready to read. This "fall-through" timing differs from conventional FIFO in that conventional FIFO buffers typically deasserts an empty flag when data is in memory 141, and an output data signal is provided later in response to the device attached to the output port. In FIG. 2, output ready signal ORB is asserted at time 230 which is sufficiently delayed to allow output data signal B[17:0] on bus 122 to be ready. One embodiment of the invention requires three cycles of clock signal CLKB after data is written to memory 141 before output is ready. Two cycles are for register stages which minimize metastability issues and a third cycle to establish proper fall-through timing. Other embodiments of the invention can use other delays.

Control logic 120 generates select signals which cause multiplexer 126 to select first one set of eighteen bits then another set of eighteen bits as output signal B[17:0]. Control logic 120 can be configured to provide the most significant eighteen bits first followed by the least significant eighteen bits (big endian order) or the least significant eighteen bits first followed by the most significant eighteen bits (little endian order). Control logic 120 maintains the same value of signal B[17:0] until a rising edge of signal CLKB occurs while an enable signal ENB from the second device is high. While signal ENB is high, control logic changes signal B[17:0] at each rising edge of signal CLKB until all data from memory 141 has been transferred to output register 144 and multiplexer 126 has selected the last 18-bits in output register 144. In the example of FIG. 2, a single 36-bit value transferred from memory 141 to output register 144 provides two 18-bit output values. The second device reads the two 18-bit values during cycles 231 and 232 of clock signal CLKB. Signal ORB is deasserted to indicate that output signal B[17:0] is not ready at time 235 to prevent further reading by the second device.

The second device asserts enable signal ENB high when the second device is ready to read signal B. At each rising edge of signal CLKB while output-ready signal ORB is asserted, the second device either reads signal B or deasserts signal ENB. In FIG. 2, during cycles 231 and 232 which occur while both signals ORB and ENB are asserted, the second device reads two 18-bit data values. In an alternative embodiment of the invention, port $B_{OUT}$ is configured for a 9-bit data signal B[8:0]. A 36-bit value loaded into output register 144 is read nine bits at a time during four clock cycles. Control logic 120 can be configured to select the 9-bit quantities in any desired order including big endian and little endian orders.

Figure 3:
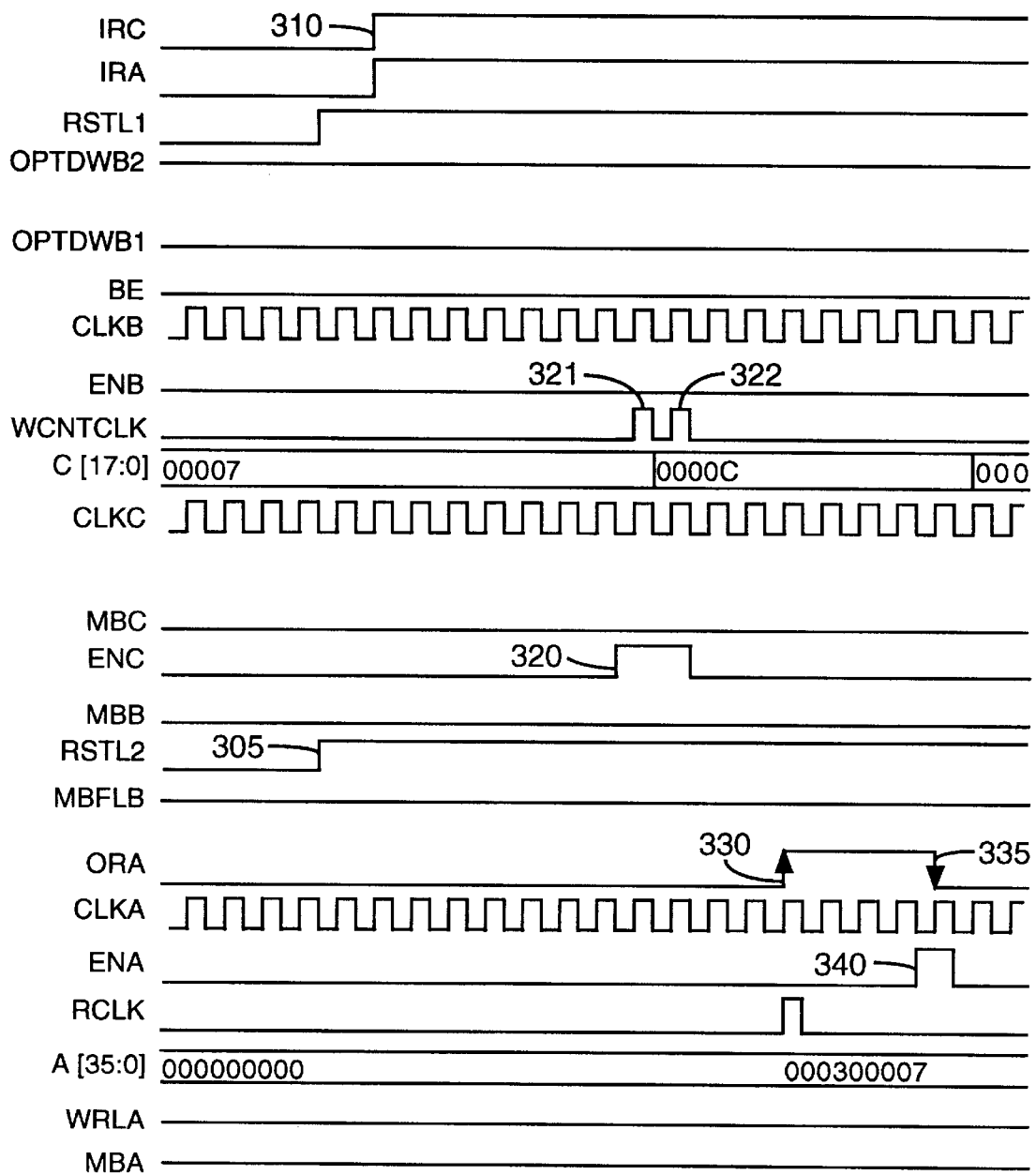

FIG. 3 shows timing diagrams for an example data transfer from a third device, which is connected to port $C_{IN}$, to the first device, which is connected to port A. In this example transfer, port $C_{IN}$ carries an 18-bit input data signal C[17:0], and port A is configured for a 36-bit output data signal A[35:0]. The third device can be simply an output section of the second device. At start-up, the third device asserts a reset signal RSTL2 low which causes reset logic 138 to reset FIFO buffer 150 and clear mail register 170. Mailbox select signal MBC is low during the transfer so that data flows through FIFO buffer 150.

Status flag logic 156 asserts input-ready signal IRC at time 310 to indicate that FIFO buffer 150 is ready for data from the third device. The third device generates a data signal C representing a desired value to be stored in FIFO buffer 150 and asserts port enable signal ENC at time 320. While input-ready signal IRC and port enable signal ENC are asserted, FIFO buffer 150 loads data signal C from the third device into input register 155 at each rising edge of a clock signal CLKC. Depending on whether the third device is ready to transfer more data, the third device either changes data signal C or deasserts port enable signal ENC. In the example of FIG. 3, signal ENC remains asserted during two cycles 321 and 322 of signal CLKC, and two 18-bit values are transferred from the third device to FIFO buffer 150. In accordance with the exemplary embodiment of the invention, input register 155 is a 36-bit register, and each 18-bit value is selectably loaded into the upper or lower halve of input register 155. Once two 18-bit values are stored in input register 155 to form a 36-bit value according to big endian or little endian order, the 36-bit value from input register 155 is written to memory 151, and write pointer 153 is incremented.

If memory 151 is not empty, the oldest 36-bit value from memory 151 is loaded into output register 154. Status flag logic 156 asserts an output-ready signal ORA to indicate that an output data signal A[35:0] is ready to be read. At time 330, output-ready signal ORA is asserted to indicate a 36-bit value loaded from memory 151 to output register 154 is ready for reading at the next rising edge of clock signal CLKA. With signal WRLA low to configure bi-directional port A for output, the first device asserts port enable signal ENA at time 340 (when the first device is ready to read from buffer 100). The first device reads data signal A[35:0] from bus 112 at time 335 which coincides with the next rising edge of clock signal CLKA. While port A is configured for output and enable signal ENA is asserted, FIFO buffer 150 either changes the value of data signal A before each rising edge of clock signal CLKA or deasserts output-ready signal ORA. The first device deasserts signal ENA if it is no longer ready for data transfer. In the example of FIG. 3, FIFO buffer 150 contains only a single 36-bit value so signal ORA is deasserted at time 335 when the first device reads signal A.

Figure 4A:
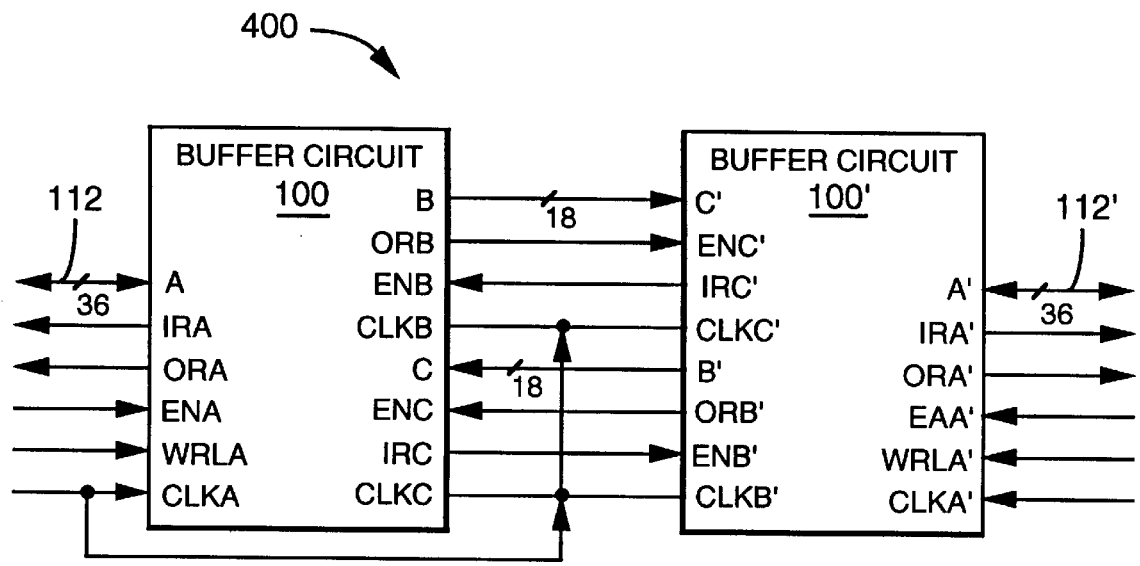
FIGS. 4A and 4B are block diagrams illustrating buffer circuits including chains of buffer ICs in accordance with the invention.

The timing sequences described in regard to FIGS. 2 and 3 provide a fall-through timing which allows buffer 100 to be easily connected to a similar buffer circuit 100' to form a buffer having increased depth. FIG. 4A shows an example of a buffer circuit 400 containing two connected buffer ICs 100 and 100'. Buffers ICs 100 and 100' operate as described above in regard to FIGS. 1, 2, and 3 and can be identical or can differ in structure or amount of memory. The total depth of buffer 400 is the sum of depths of buffers 100 and 100'.

Buffer 400 is a bi-directional FIFO buffer. First and second devices respectively connect to ports A and A'. Data from the first device flows in port A, out port $B_{OUT}$, in port $C'_{IN}$, and out port A' to the second device. Data from the second device flows in port A', out port $B'_{OUT}$, in port $C_{IN}$, and out port A to the first device. Data transfer into and out of buffer 400 at rates according to clocks signals CLKA and CLKA' of the first and second devices. Data flow between buffers 100 and 100' can flow in both directions simultaneously. A clock signal CLKA from the first device is input as signals CLKB, CLKC', CLKB', and CLKC to control the rate of data flow between buffers 100 and 100', i.e. from port BOUT to port $C'_{IN}$ and from port $B'_{OUT}$ to $C_{IN}$.

To maximize data flow rate between buffers 100 and 100' and minimize the possibility of creating bottlenecks, signal CLKA is preferably the faster of the clock signals from the devices connected to buffer circuit 400. In an embodiment where ports $B_{OUT}$ and $C_{IN}$ each have half the data width of port A, no bottle necks occur if clock signal CLKA is as fast as the faster of signals CLKA and CLKA' and if ports A and A' are used equally for reads and writes.

Figure 4B:
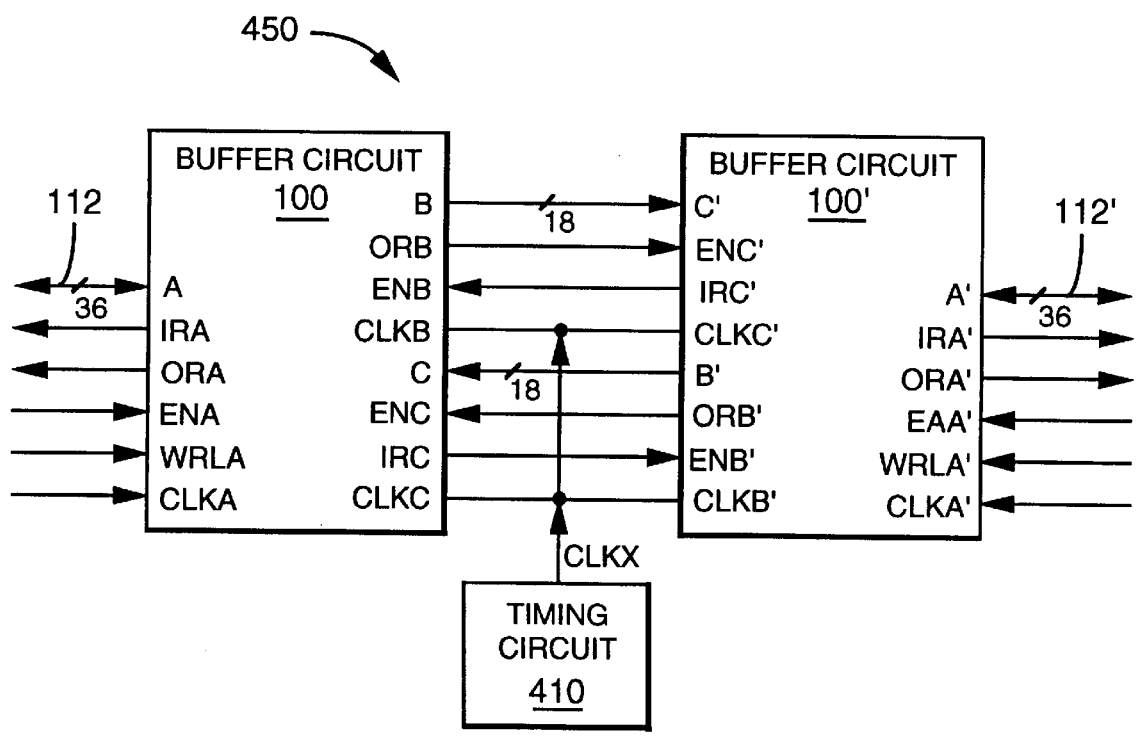

FIG. 4B shows an alternative buffer 450 connecting buffer 100 and 100' with an external timing circuit 410 generating a clock signal CLKX as signals CLKB, CLKC', CLKB', and CLKC to control the rate of data flow between buffers 100 and 100'. Timing circuit 410 can generate signal CLKX from signal CLKA, signal CLKA', or an external oscillator. If clock signal CLKX is approximately twice the frequency of the faster of signals CLKA and CLKA', bottlenecks are avoided even when buffer 450 is used as a one-way FIFO buffer. A disadvantage of buffer 450 is the required addition of timing circuit 410.

Figure 5:
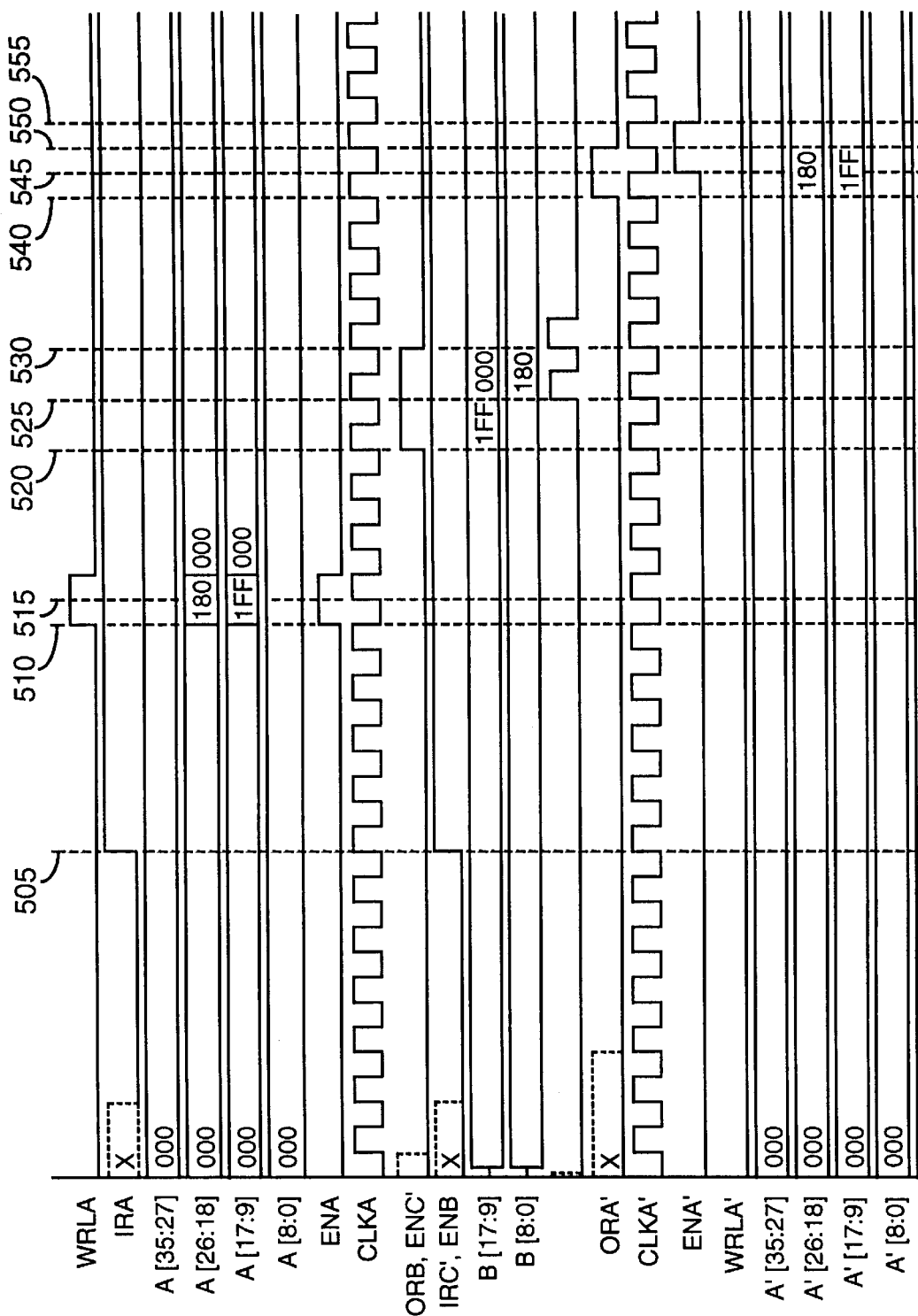
FIG. 5 shows timing diagrams for data transfers through the buffer of FIG. 4A.

FIG. 5 shows timing diagrams for an exemplary data transfer from the first device, which is connected to port A of FIFO buffer 400 of FIG. 4A, to the second device, which is connected to port A' of FIFO buffer 400. At time 505, after buffers 100 and 100' are reset, FIFO buffer 100 asserts input-ready signals IRA and IRC, and FIFO buffer 100' asserts input-ready signals IRA' and IRC'. The first device asserts signals WRLA to configure data port A for input, drives a 36-bit data signal A on bus 112, and asserts port enable signal ENA at time 510. In FIG. 5, the 36-bit value being transferred has four 9-bit parts, A[35:27], A[26:18], A[17:9] and A[8:0] which have values 000h, 180h, 1FFh, and 000h. At time 515, which corresponds to a rising edge of clock signal CLKA, data signal A is written in to buffer 100. The enable signal ENA is deasserted to indicate that the first device does not have further data ready to transfer.

Subsequently, at time 520, buffer 100 generates a first 18-bit value for output data signal B which is input data signal C' for buffer 100' and asserts output-ready signal ORB which is port enable signal ENC' for buffer 100'. The exemplary transfer uses little endian order so that the first 18-bits includes two 9-bit values 1FFh and 000h which are the least significant bits of the 36-bit value to be transferred. Buffer 100' reads the 18-bit data value at time 525 which corresponds to a rising edge of signal CLKA (or CLKC') occurring while port enable signal ENC' and input ready signal IRC' are asserted. Since input-ready signal IRC' from FIFO buffer 100' keeps port enable signal ENB high, buffer 100 changes data signal B to a second 18-bit value, 000h and 180h. At time 530, the next rising edge of signal CLKC', buffer 100' next reads signal B. Buffer 100 then deasserts output ready signal ORB (port enable signal ENC') because the last value in buffer 100 has been transferred.

Buffer 100' stores a 36-bit value formed from the two 18-bit values and then asserts output-ready signal ORA' at time 540 to indicate data signal A' is ready to read from bus 112'. Write/read select signal WRLA' already is low to configure port A' for reading by the second device. The second device asserts port enable signal ENA' when the second device is ready to read from buffer 100' (time 545) and reads signal A' at the next rising edge of clock signal CLKA' (time 550). Buffer 100' deasserts output-ready signal ORA' at time 550 because buffer 100' is then empty and no further data signals are ready for transfer. At time 555, the second device deasserts signal ENA' to indicate the second device is not longer ready for input.

Figure 6:
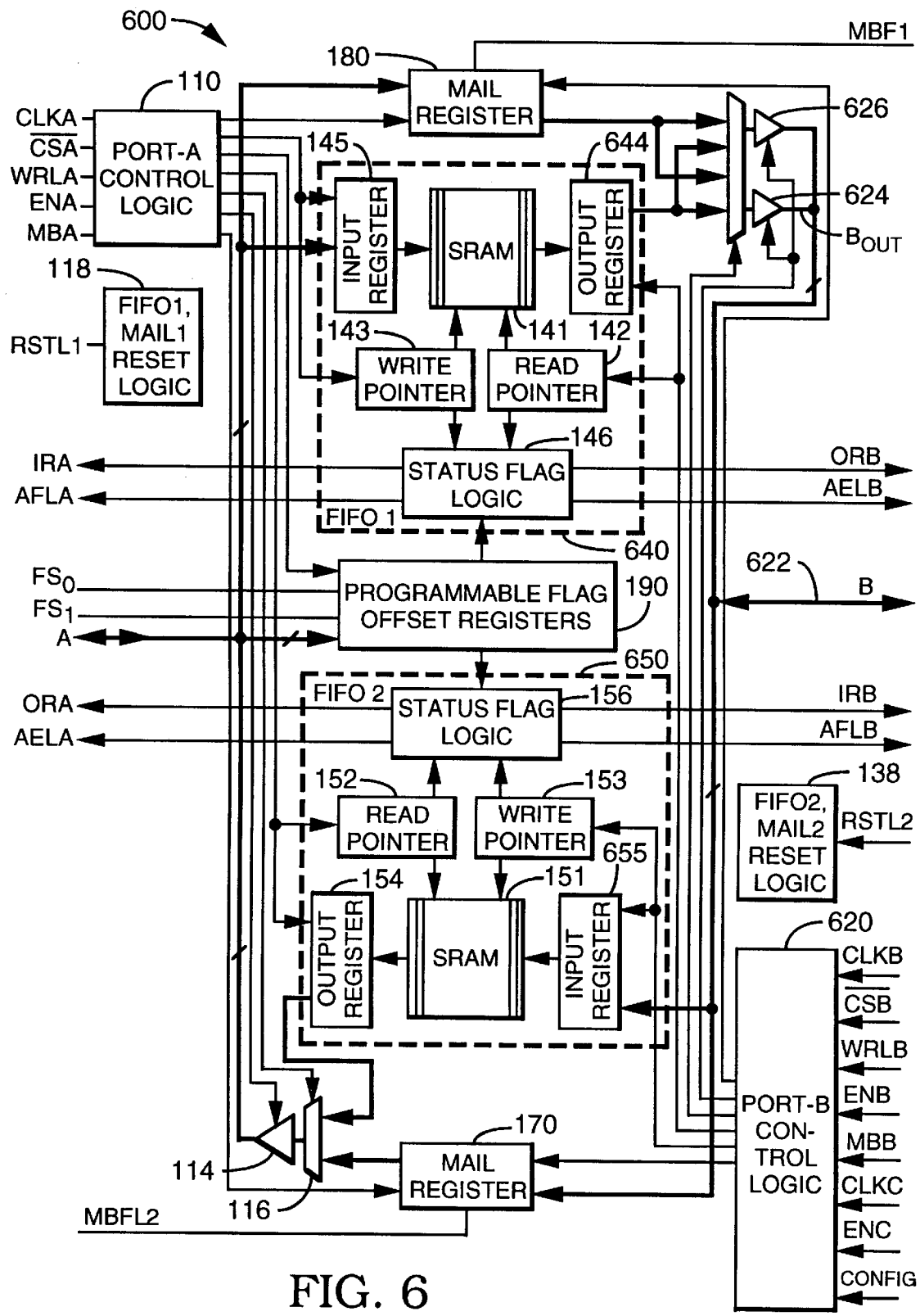
FIG. 6 shows a block diagram of a buffer in accordance with another embodiment of the invention.

FIG. 6 shows a block diagram of a buffer IC 600 in accordance with another embodiment of the invention. Buffer IC 600 provides a bi-directional FIFO buffer having a bi-directional port A and a configurable port B. Port A operates as described above for buffer 100. Port B includes port control logic 620 and a multi-bit bus 622 and is configurable so that buffer IC 600 can operate in a dual-bus or triple-bus configuration. In the dual-bus configuration, port B is a single bi-direction port. In the triple-bus configuration, port B provides two separate ports by partitioning the lines of bus 622 between an input port $C_{IN}$ and an output port $B_{OUT}$ which operate as described in regard to FIG. 1.

Control logic 620 uses a multi-bit configuration signal CONFIG to determine how port B is configured. Signal CONFIG may include: a signal TRIBUS which indicates whether buffer 600 has the dual-bus or triple-bus configuration; signals OPTDW which indicate data widths for a bi-directional bus or for an input bus and an output bus; and a signal BE which indicates whether big or little endian order is used during bus matching. Typically, signal CONFIG does not change during operation of buffer 600, and individual bits in signal CONFIG may be user accessible or may be set during manufacturing, for example, by wiring during packaging of buffer IC 600 or by blowing fuses or antifuses in buffer IC 600.

In the dual port configuration, port B operates in the same manner as port A described above. A write/read select signal WRLB selects whether bus 622 is for input or output. Signals CSB, CLKB, IRB, ORB, and ENB are respectively the chip select signal, clock signal, input-ready signal, output ready signal, and port enable signal as described above for bi-directional port A. Port B can be configured as a bi-directional port having a data width equal to, smaller than, or greater than the data width of port A. In an exemplary embodiment, port B is configurable for a 36-bit, 18-bit, or 9-bit data width and port A has a fixed 36-bit data width. FIFO buffers 640 and 650 perform bus matching when the data widths of ports A and B differ.

In the triple-bus configuration, port B forms input port $C_{IN}$ and output port $B_{OUT}$ which operate in the same manner as described above for buffer 100. Signals such as write/read signal WRLB which is not needed for the triple-bus configuration can share an I/O pin with a signal such as port enable signal ENC which is not required for the dual bus configuration. In the exemplary embodiment, bus 622 carries a 36-bit signal B[35:0]. For the triple-bus configuration, bits B[35:18] are the input data signal C[17:0], and bits signal B[17:0] are the output data signal. Port control logic 620 uses a tri-state buffer 626 to prevent FIFO buffer 640 from driving the signals on lines used for input port $C_{IN}$.

Figure 7A:
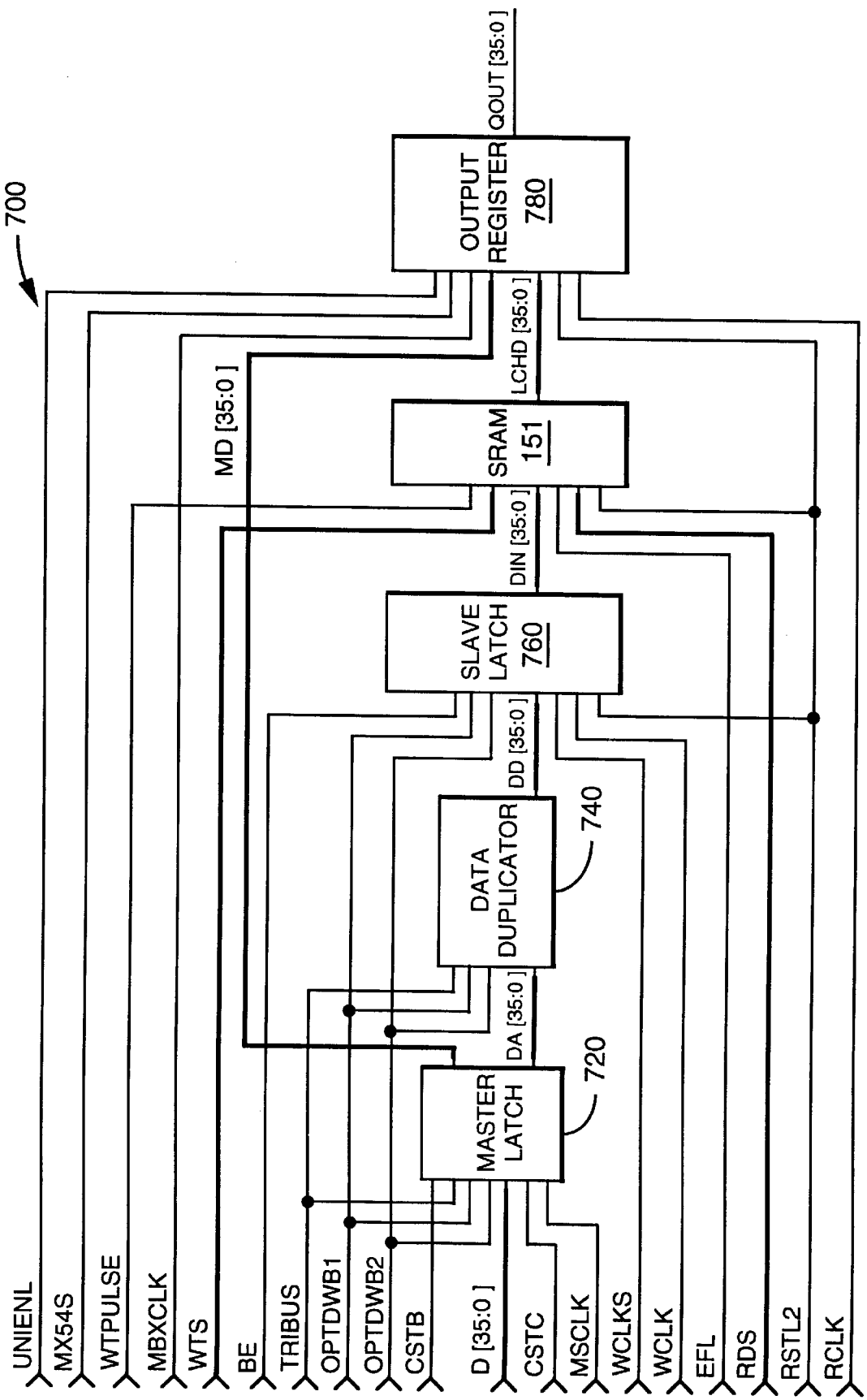
FIGS. 7A, 7B, 7C, and 7D show block and circuit diagrams for a data path through a buffer having a flexible input interface in accordance with an embodiment of the invention.

FIGS. 7A to 7D show block diagrams of circuits which implement a data path through FIFO buffer 650 and mail register 170 of FIG. 6. The data path in FIG. 6 includes input register 655, memory 151 or mail register 170, output register 154, and multiplexer 116. FIG. 7A is the highest level block diagram of the data path and shows a master latch 720, a data duplicator 740, and a slave latch 760 which together implement the functions of input register 655 and mail register 170. An output register 780 implements the functions output register 154 and multiplexer 116 of FIG. 6.

Figure 7B:
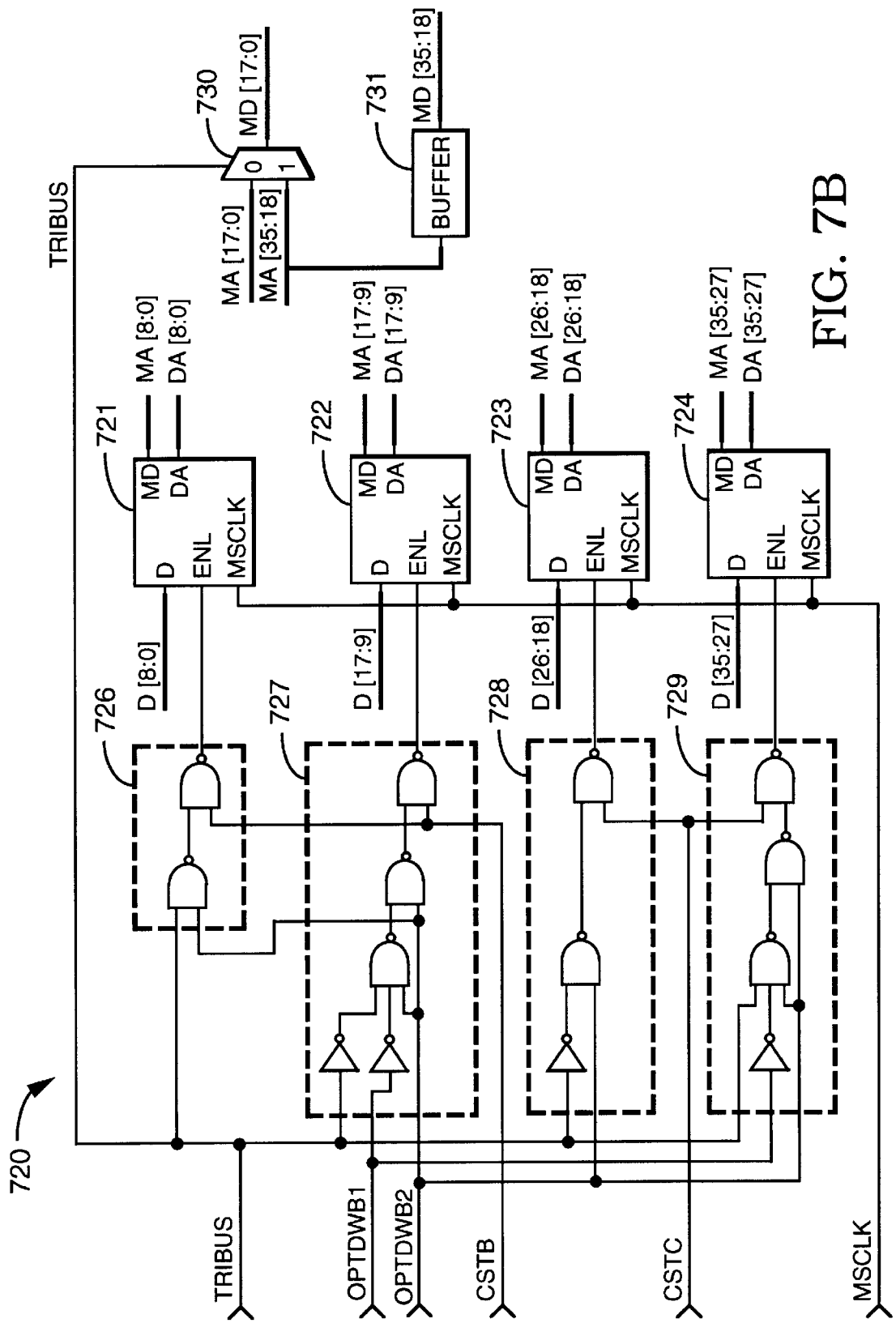

FIG. 7B shows a block diagram of master latch 720. Master latch 720 contains four 9-bit latches 721 to 724. Each of latches 721 to 724 is connected to a corresponding set of nine lines of bus 622. Bus 622 carries a data signal D[35:0]. In the triple-bus configuration, some bits of signal D[35:0] are input data and some bits of signal D[35:0] are output data. Each latch 721 to 724 is enabled only if the corresponding set of nine bits from data signal D[35:0] is part of an input signal. Signal CONFIG which indicates the configuration of port B and has component signals OPTDWB1, OPTDWB2, and TRIBUS which indicate the data width of the input signal for port B and whether port B is configured for the triple bus configuration. If signal OPTDWB2 is low, port B is a 36-bit port. If signal OPTDWB2 is high, signal OPTDWB1 being low or high indicates port B receives 18-bit or 9-bit data signals. When the data width of port B is less than 36 bits, signal BE indicates whether input data is combined in big endian or little endian order for storage in memory 151.

Logic 726 to 729 enables corresponding latches 721 to 724 if lines of bus 622 connected to input terminals of the corresponding latches carry input data signals. Master latch 720 uses chip select signals CSTB and CSTC which respectively indicate whether bits 0 to 17 and bits 18 to 35 of signal D[35:0] are for the chip containing data path 700.

For all dual-bus configurations, signal TRIBUS is low, and latch 721 is enabled. Latch 722 is enabled in the dual-bus configurations unless port B is configured as 9-bit port. Latches 723 and 724 are enabled in the dual bus configuration if port B is configured as a 36-bit data port.

Signal TRIBUS is high for the triple-bus configuration where some or all of bits 1 to 17 of port B form port $B_{OUT}$ and some or all of bits 18 to 35 of port B form port $C_{IN}$. For the triple-bus configuration, at D[17:0] are for output data or are not used, and latches 721 and 722 are disabled. Latch 723, which corresponds to least significant nine bits of input data, is enabled when signal TRIBUS is high. Latch 724, which corresponds to the next nine bits of data, is enabled if signal TRIBUS is high and signals OPTDWB2 and OPTDWB1 configure port B for eighteen bits of data.

While a clock signal MSCLK is high, the enabled ones of latches generate bits of signals MA[35:0] and DA[35:0] which are equal to corresponding input bits of signal D[35:0] at the rising edge of signal MSCLK. Signal MA[35:0] is for mail box data and is applied to a multiplexer 730 and a buffer 731. Multiplexer 730 selects either MA[35:18] or MA[17:0] as signal MD[17:0]. MD[17:0] is equal to MA[35:18] for the triple-bus configuration where bits D[17:0] is an output signal. Buffer 731 sets signal MD[35:18] equal to MA[35:18]. As shown in FIG. 7A, signal MD[35:0] is applied directly to output register 780, bypassing data duplicator 740, slave latch 760, and memory 151.

Figure 7C:
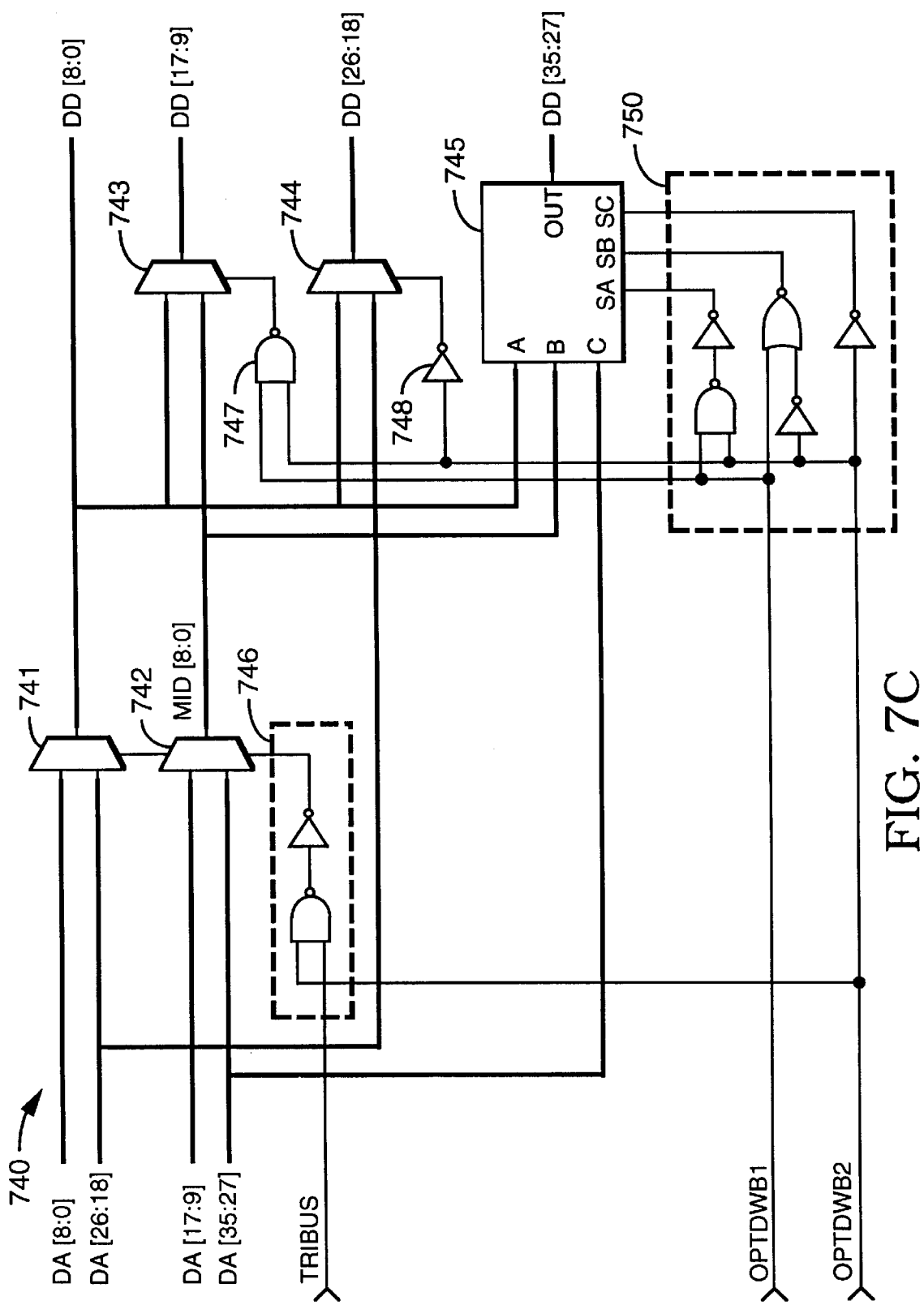

Latches 721 to 724 provide signal DA[35:0] to data duplicator 740 which then generates a signal DD[35:0] representing a 36-bit input value, two copies of an 18-bit input value, or four copies of a 9-bit input value. FIG. 7C shows an embodiment of data duplicator 740 which contains multiplexers 741 to 745 which selects bits from signal DA[35:0] to generate signal DD[35:0]. Bits DD[8:0] are always the least significant bits of the input value, and multiplexer 741 and related select logic 746 select bits DA[8:0] for the dual-bus configuration or bits DA[26:18] for the triple-bus configuration. Multiplexer 742 and select logic 746 similarly provide as an output signal MID[8:0] which is either bits DA[17:9] or bits DA[35:27] depending on whether triple-bus configuration is used. For signal DD[17:9], multiplexer 743 selects signal MID[8:0] if port B is configured for eighteen bits or more or selects DD[8:0] if port B is configured for nine bits. For signal DD[26:18], multiplexer 744 selects DD[8:0] if port B is not a 36-bit port (i.e. if signal OPTDWB2 is high) or signal DA[26:18] if port B is a 36-bit port. For signal DD[35:27], multiplexer 745 and associated select logic 750 select signal DD[8:0], DD[17:9], or DA[35:27] if port B is respectively a 9-bit, 18-bit, or 36-bit port.

Signal DD[35:0] is asserted to slave latch 760 which over one, two, or four clock cycles collects selected bits from signal DD[35:0] to generate a signal DIN[35:0]. Once all necessary bits are collected, a 36-bit value represented by signal DIN[35:0] is written to SRAM 151. If port B is 36 bits wide, slave latch 760 latches all 36 bits of signal DIN[35:0], and signal DD[35:0] is ready to be written. If port B is eighteen bits wide, slave latch 760 latches eighteen bits from signal DD[35:0] in one clock cycle and holds those eighteen bits during a second cycle in which eighteen more bits from a new value of signal DD[35:0] are latched. If port B is nine bits wide, four cycles are required before signal DIN[35:0] is ready.

Figure 7D:
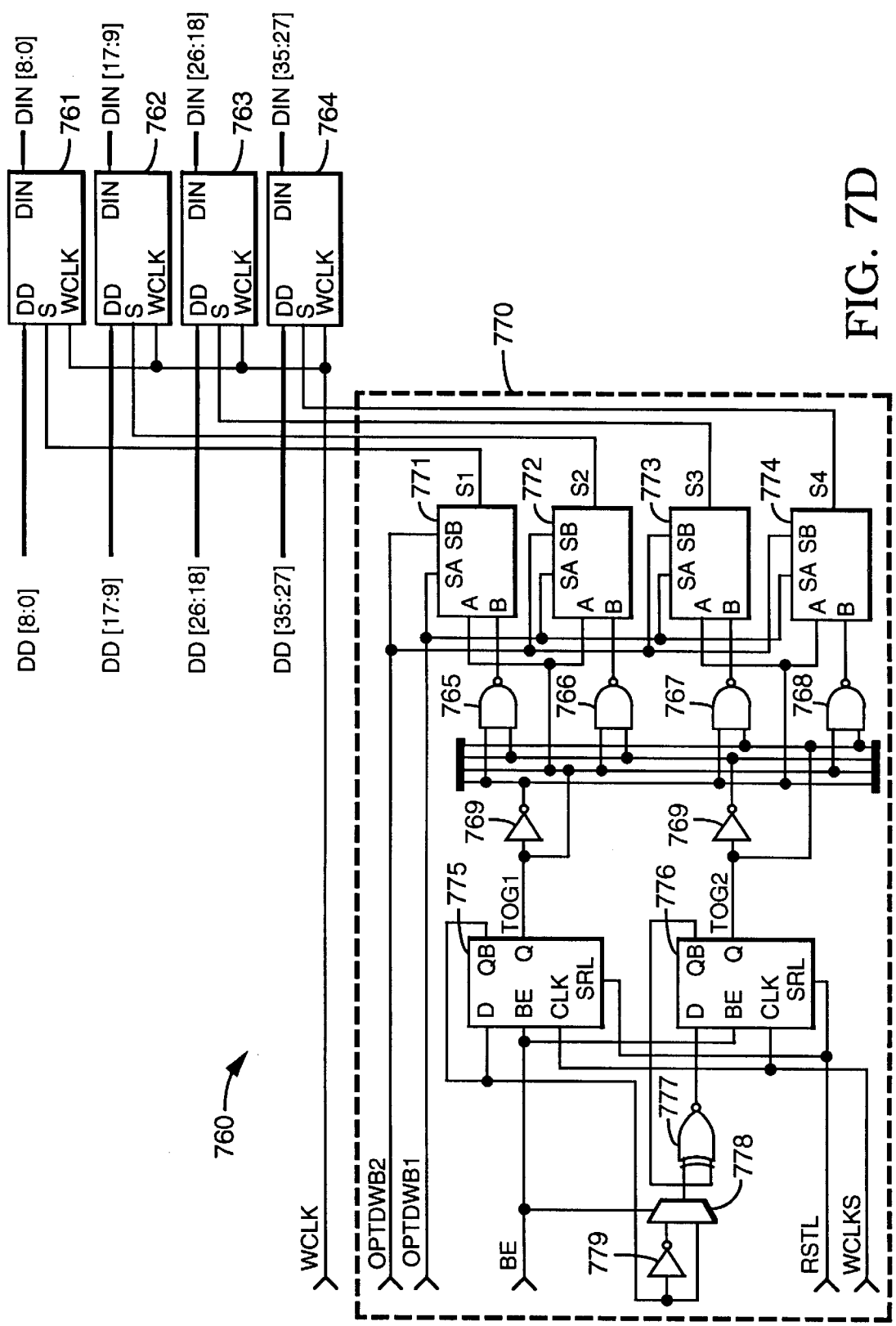

FIG. 7D shows an embodiment of slave latch 760 which contains sequence control logic 770 and four 9-bit latches 761 to 764. Each cycle of a clock signal WCLK, sequence control logic 770 enables one or more of latches 761 to 764 for collecting bits from signal DD[36:0] which are held until signal DIN[35:0] is written to memory 151. Signals S1 to S4 enable respective latches 761 to 764 in a pattern which depends on the input data width of port B as indicated by signals OPTDWB2 and OPTDWB1 and on whether data is collected in big endian or little endian order as indicated by signal BE. If signal OPTDWB2 is low, signals S1 to S4 are all high to enable all of latches 761 to 764. Otherwise latches are enabled two at a time when input data is 18-bits wide or one at a time when input data is 9-bits wide.

Sequence control logic 770 includes four selection blocks 771 to 774. Selection blocks 771 to 774 are identical, and each has select terminals SA and SB which carry signals OPTDWB1 and OPTDWB2, respectively. If signal OPTDWB2 is low indicating a 36-bit data width, selection blocks 771 to 774 force output signals S1 to S4 high to enable all of latches 761 to 764. If signal OPTDWB2 is high, each one of selection blocks 771 to 774 acts as a multiplexer with signal SA selecting as an output signal either the input signal of terminal A or terminal B.

When signal OPTDWB2 and OPTDWB1 are high and low respectively, input at port B is 18 bits wide, and selection blocks 771 to 774 select the input signals to terminals A. A flip-flop 775 provides a single signal TOG1 to terminals A of selection blocks 771 and 772, and an inverted version of signal TOG1 to terminals A of selection blocks 773 and 774. Flip-flop 775 has an inverted output terminal QB connected to its input terminal D so that signal TOG1 changes each cycle of clock signal WCLKS. Accordingly, sequence control logic 770 alternately asserts signals S1 and S2 or signals S3 and S4 to store 18 bits in latches 761 and 762 or latches 763 and 764. Signal BE controls whether logic 770 asserts signals S1 and S2 or signals S3 and S4 first. If signal BE indicates big endian order, a signal RSTL resets flip-flop 775 so that signals S3 and S4 are asserted first. If signal BE indicates little endian order, signal RSTL sets flip-flop 775 so that signals S1 and S2 are asserted first.

If signals OPTDWB1 and OPTDWB2 are both high, select blocks 761 select the signals at terminals B. Sequence control logic 770 acts as a counter which sequentially selects latches 761, 762, 763, and 764. Signal BE selects the starting latch 761 or 764 and the direction in which the selections proceed, from latch 761 to latch 764 or from latch 764 to latch 761.

Returning to FIG. 7A, during input of data through port B, a pulse in signal WTPULSE is generated to trigger writing of a value indicated by signal DIN[35:0] to an address in SRAM 151 indicated by multi-bit signal WTS. Signal WTS is from write pointer register 153 which is incremented each time a value is written to memory 151. Signal EFL immediately initiates reading from memory 151 to generate a signal LCHD[35:0] representing a value stored at an address in memory 151 indicated by a signal RDS from read pointer register 152. An edge of a signal RCLK, which is derived from clock signal CLKA, causes output register 780 to store the value indicated by signal LCHD[35:0] when an old value in register 780 has been read.

Signals MX54S, MBXCLK, and UNIENL control mailbox functions. When signal MX54S is asserted, an edge of signal MBXCLK causes register 780 to store the value indicated by signal MD[35:0] which as indicated above is mailbox data that bypasses memory 151. Signal UNIENL being asserted low disables all FIFO data transfers input to port B and output from port A so that only a one-directional FIFO buffer directed with input at port A and output at port B is enabled. However, mailbox transmissions input through port B and output from port A are still permitted.

Figure 8A:
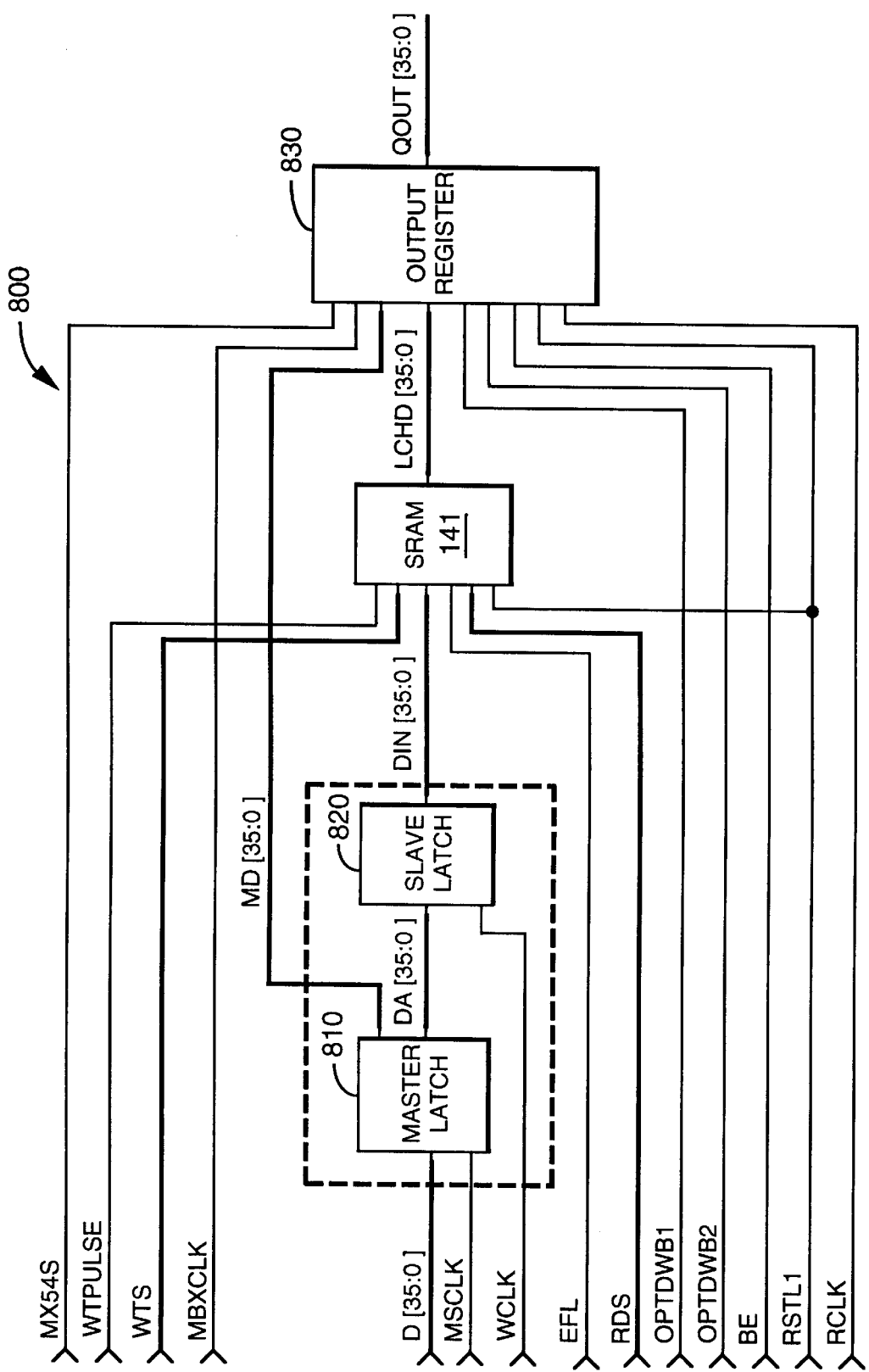
FIGS. 8A and 8B show block and circuit diagrams for a data path through a buffer having a flexible output interface in accordance with an embodiment of the invention.
Figure 8B:
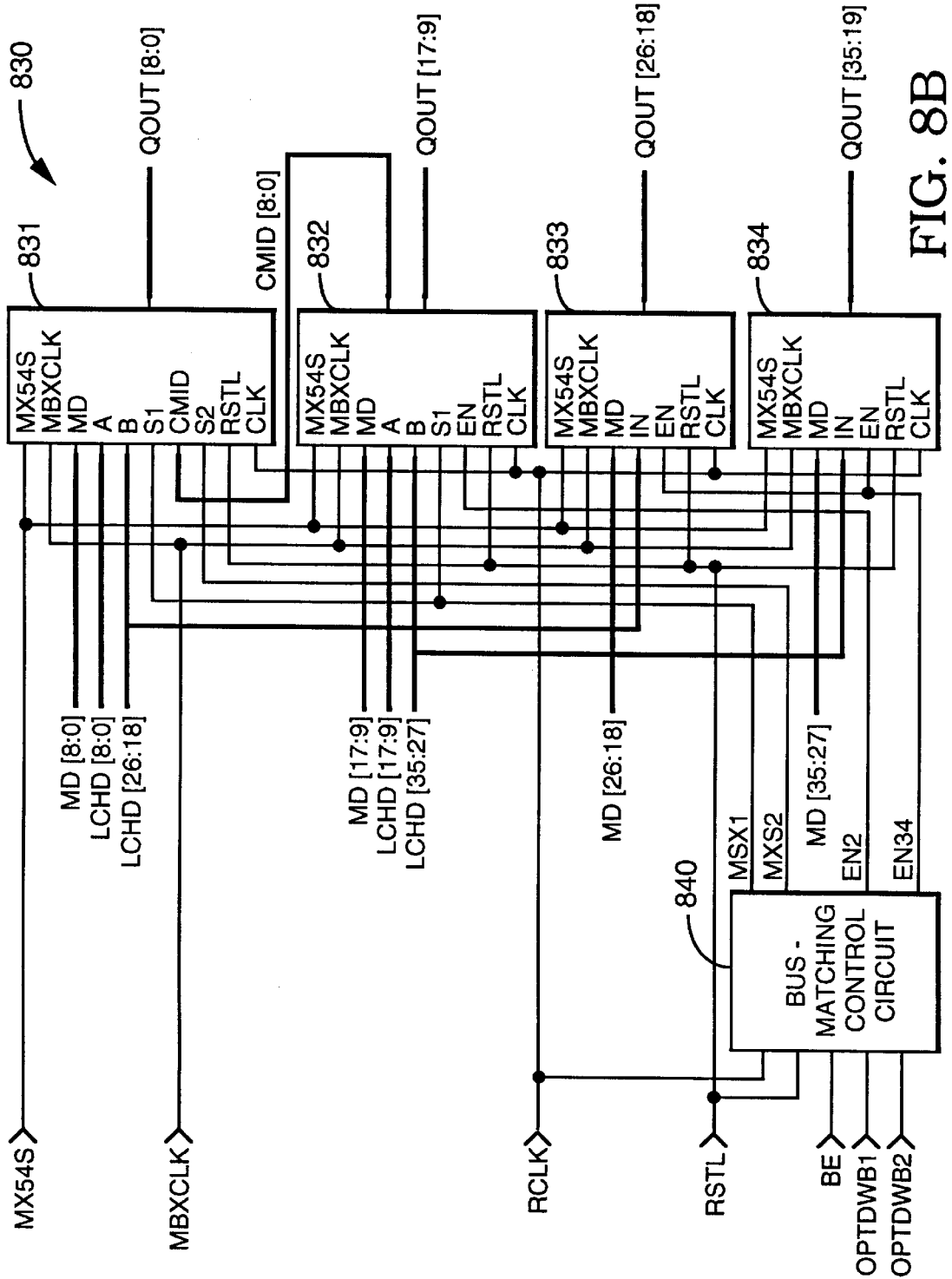

FIGS. 8A and 8B show an exemplary embodiment of a data path 800 suitable for data flow from port A to port B in buffer 600. The data path 800 differs in function from data path 700 of FIGS. 7A in that the input side of data path 700 performs bus matching functions while the output side the data path 800 performs bus matching functions. FIG. 8A shows a highest level block diagram of data path 800. Data path 800 includes a master latch 810, a slave latch 820, a memory 141, and an output register 830. Master latch 810 and slave latch 820 together act as an input register. Master latch 810 receives a data signal D[35:0] from port A and transmits latched signals MD[35:0] and DA[35:0] when a signal MSCLK is high. Signal MD[35:0] is for mailbox data and is directly transmitted to output register 830. Signal DA[35:0] represents data to be written to memory 141 and is transmitted to slave latch 820.

When a write clock signal WCLK is high, slave latch 820 latches signal DA[35:0] and transmits signal DIN[35:0] to SRAM 141, and the value represent by signal DIN[35:0] is written to SRAM 141 at an address indicated by a multi-bit address signal WTS from write pointer register 143. A multi-bit address signal RDS from read pointer register 142 indicates an address in memory 141 from which a 36-bit value represented by signal LCHD[35:0] is read.

FIG. 8B shows a block diagram of an embodiment of output register 830. Output register 830 contains four 9-bit register circuits 831 to 834 and a control circuit 840. Each of register circuits 831 to 834 contains nine bits of storage, an input multiplexer to select a signal to be stored, and driver circuitry which provides nine bits of an output signal QOUT[35:0] when the driver circuitry is enabled.

First portions of the multiplexers in register circuits 831 to 834 select either mailbox data (signal MD) or FIFO data (signal LCHD) from memory 141 for storage. An edge of a signal MBXCLK causes register circuits 831 to 834 to store the value indicated by signal MD[35:0] which as indicated above is mailbox data that has bypassed memory 141. Register circuit 831 always provides its stored value as output signal QOUT[8:0]. Register circuits 832 to 834 only provide respective output signals QOUT[17:9], QOUT[26:18], and QOUT[35:27] if control circuit 840 enables their respective driver circuits. A signal EN2 form control circuit 840 enables register circuit 832 if the output signal from bus B is at least eighteen bits wide. A signal EN34 from control circuit 840 enables register circuits 833 and 834 if output from bus B is 36 bits wide.

An edge of signal RCLK causes register circuits 831 to 834 to store data from memory 141 which can be directly provided via signal LCHD[35:0] or indirectly provided via a signal CMID[8:0] from register circuit 832. For data from memory 141, register circuits 833 and 834 respectively store signals LCHD[26:18] and LCHD[35:27], but control circuit 840 only enables register circuits 833 and 834 to drive output signals QOUT[26:18] and QOUT[35:27] if bus B is configured for 36-bit output data signals. Register circuit 832 stores signal LCHD[17:9] or LCHD[35:27], and register circuit 831 stores signal LCHD[8:0], LCHD[17:9], or CMID[8:0].

When bus B is configured for a 36-bit output signal, control circuit 840 generates select signals MXS1 and MXS2 which cause register circuits 831 and 832 to respectively store signals LCHD[8:0] and LCHD[17:9]. Register circuits 833 and 834 respectively store signals LCHD[26:18] and LCHD[35:27]$_1$, at the edge of signal RCLK, and enable signals EN2 and EN34 enable register circuits 832 to 834 so that a full 36-bit output signal QOUT is asserted.

When bus B is configured for an 18-bit output signal, register circuits 833 and 834 are disabled, and register circuit 832 is enabled. Output signal QOUT[17:0] provides in two clock cycles two 18-bit values which form a 36-bit value. At an edge of a first clock cycle, control circuit 840 generates select signals MXS1 and MXS2 which cause register circuit 831 to store signals LCHD[8:0] or LCHD[26:18]. The value represented by signal LCHD[26:18] is stored in register circuit 831 if signal BE indicates big endian order. Otherwise, the value represented by signal LCHD[8:0] is stored in register circuit 831. Signal MXS1 similarly causes register circuit 832 to store signals LCHD[17:9] or LCHD[35:27] depending on signal BE. Output signal QOUT[17:0]

is equal to the selected signals stored in register circuits 831 and 832. At an edge of a second clock cycle, control circuit 840 generates select signals MXS1 and MXS2 which cause register circuit 831 to store the other of signals LCHD[8:0] and LCHD[26:18] and register circuit 832 to store the other of signals LCHD[17:9] or LCHD[35:27]. Output signal QOUT[17:0] is equal to those signals for the second clock cycle. At the end of two clock cycles, all 36 bits of signal LCHD have been transferred through port B, and a value can be read from memory 141 if one is available.

When bus B is configured for a 9-bit output signal, a 36-bit value represented by signal LCHD[35:0] is provide as four 9-bit values represented by output signals QOUT[8:0] in four clock cycles. Output signals QOUT[17:9], QOUT [26:18], and QOUT[35:27], from register circuits 832 to 834 are disabled. At an edge of a first clock cycle, control circuit 840 generates select signals MXS1 and MXS2 which cause register circuit 831 to store signal LCHD[8:0] or CMID[8:0] depending on whether big or little endian order is desired. Register circuit 832 contains a multiplexer which selects either LCHD[35:27] as signal CMID[8:0] during the first clock cycle. Register circuit 831 provides the first 9-bit signal QOUT[8:0]. At edges of second and third clock cycles, control circuit 840 generates select signals MXS1 and MXS2 which cause register circuit 831 to store one then the other of signals LCHD[26:18] and CMID[8:0]. Signal CMID[8:0] equals LCHD[17:9] during the second and third clock cycles, and signals LCHD[26:18] and CMID[8:0] are stored according to big or little endian order. At an edge of a fourth clock cycle, control circuit 840 generates select signals MXS1 and MXS2 which cause register circuits 831 to store signal LCHD[8:0] or CMID[8:0], which is then equal to LCHD[35:27] which provides the fourth 9-bit value.

Data paths 700 (FIG. 7A) and 800 (FIG. 8A) provide bus matching functions at port B. Bus matching at port A is not required because port A has the same data width as memories 141 and 151. A buffer IC in accordance with another embodiment of the invention has two ports which are configurable in the same way as port B of buffer IC 600, i.e. to act as bi-directional port or as separate input and output ports. Replacing output register 780 in FIG. 7A with output register 830 of FIG. 8B provides a data path with bus matching at both configurable ports A and B. Buffer ICs having two configurable ports have great flexibility. The buffer can be configured for a dual-bus, triple-bus, or quadruple-bus configuration, and a series of two, three, or more such buffer ICs can be connected together to create a buffer circuit having expanded depth. Buffer circuits of arbitrary depth can thus be created at the expense of increasing transmission delay through the buffer circuit.

Although the present invention has been described with reference to particular embodiments, the description is only an example of the invention's application and should not be taken as a limitation. In particular, even though much of preceding discussion was aimed at embodiment using particular data widths, alternative embodiments are applicable to any desired data width buses. Additionally, although the particular examples of bus matching were described where a smaller bus is one half or one quarter of the data width of a larger bus, alternative embodiments might employ a smaller bus with a data width that is one third, one eighth, or any integer fraction of the data width of the larger bus. Various other adaptations and combinations of features of the embodiments disclosed are within the scope of the present invention as defined by the following claims.

We claim:

1. An integrated circuit comprising:
   a first FIFO buffer;
   an input port that provides an interface for writing data from outside the integrated circuit, into the first FIFO buffer;
   a second FIFO buffer:
   an output port that provides an interface for reading data from the second FIFO buffer, out of the integrated circuit; and
   a bi-directional port that provides an interface for reading data from the first FIFO buffer, out of the integrated circuit and an interface for writing data from outside the integrated circuit, into the second FIFO buffer, wherein
   the bi-directional port has a first data width and the input port has a second data width that differs from the first data width, and wherein
   the first FIFO buffer and the input port together comprise:
      a memory having the first data width;
      an input register having a plurality of independently accessible storage sections wherein output terminals from all the storage sections collectively provide a first data signal having the first data width;
      an input bus; and
      control logic which controls latching of data values represented by a second data signal on the input bus, wherein for each data value latched from the input bus, the control logic selects one of the storage sections into which the data value is stored, and wherein a value represented by the first data signal is written to the memory after each storage section stores a value from the second data signal.

2. The integrated circuit of claim 1, wherein the control logic is configurable to select storage section of the input register in different orders, a first order providing the first data signal with a value that is a big endian order combination of values from the second data signal, a second order providing the first data signal with a value that is a little endian order combination of values from the second data signal.

3. The integrated circuit of claim 1, wherein the bi-directional port has a first data width, and the output port has a second data width that differs from the first data width.

4. An integrated circuit comprising:
   a first FIFO buffer,
   an input port that provides an interface for writing data from outside the integrated circuit, into the first FIFO buffer;
   a second FIFO buffer;
   an output port that provides an interface for reading data from the second FIFO buffer, out of the integrated circuit; and
   a bi-directional port that provides an interface for reading data from the first FIFO buffer, out of the integrated circuit and an interface for writing data from outside the integrated circuit into the second FIFO buffer, wherein:
      the bi-directional port has a first data width, and the output port has a second data width that differs from the first data width, and data written into the second FIFO buffer in one access through the bi-direction port is transferred out of the second FIFO buffer through multiple accesses of the output port.

5. The integrated circuit of claim 4, wherein the output port is configurable to match data transferred during a first of the multiple accesses with a first group of bits or a second group of bits in the data transferred in the single access through the bi-directional port.

6. A first-in first-out buffer comprising a first buffer unit and a second buffer unit, wherein each buffer unit comprises:

a first memory having an output interface comprising:
  a first terminal for input of an enable signal;
  a second terminal for output of an output-ready signal;
  an output data bus;
  a data selection circuit coupled to the first memory and the output data bus, wherein the data selection circuit reads the first memory and changes a data signal to represent at least a portion of a value read from the first memory, the changes being synchronized with a clock signal for the output interface and occurring while both the enable signal and the output-ready signal are asserted; and
  output control logic which asserts the output-ready signal to indicate the data signal on the data bus is ready to be read;

a second memory having an input interface comprising:
  a third terminal for input of an enable signal;
  a fourth terminal for output of an input-ready signal;
  an input data bus; and
  input control logic which asserts the input-ready signal to indicate the input interface is ready to latch data indicated by a data signal on the input data bus, wherein latching data is synchronized with a clock signal for the input interface that occurs while both the input-ready signal and the enable signal are asserted, and wherein:
  the first, second, third, and fourth terminals of the first buffer unit are respectively coupled to the fourth, third, first, and second terminals of the second buffer unit;
  the output data bus of the first buffer unit is coupled to the input data bus of the second buffer unit; and
  the output data bus of the second buffer unit is coupled to the input data bus of the first buffer unit.

7. The buffer circuit of claim 6, wherein each of the first and second buffer units further comprises an input/output interface for providing input data to the first memory and output data from the second memory.

8. The buffer of claim 6, wherein the output control logic in each of the first and second buffer units deasserts the output-ready signal in response to the data selection circuit being unable to change the data signal during a next cycle of the clock signal.

9. The buffer of claim 6, further comprising a clock circuit which provides the clock signals for the input and output interfaces of the first and second buffer units.

10. The buffer of claim 6, wherein the clock signals for the input and output interfaces of the first and second buffer units are all identical.

11. The buffer of claim 6, wherein the first buffer unit is formed on a first integrated circuit and second buffer unit is formed on a second integrated circuit.

* * * * *